(12) United States Patent
Chan

(10) Patent No.: US 8,176,176 B1
(45) Date of Patent: May 8, 2012

(54) SCHEDULING DATA PUSHES TO A MOBILE DEVICE BASED ON USAGE AND APPLICATIONS THEREOF

(75) Inventor: Michael Chan, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/250,296

(22) Filed: Sep. 30, 2011

Related U.S. Application Data

(63) Continuation of application No. 13/207,221, filed on Aug. 10, 2011.

(60) Provisional application No. 61/372,273, filed on Aug. 10, 2010.

(51) Int. Cl.
  *G06F 15/16* (2006.01)
(52) U.S. Cl. ........ 709/224; 709/203; 709/205; 709/206; 709/225; 709/248; 713/320; 455/405
(58) Field of Classification Search .................. 709/203, 709/205–206, 248, 224, 225; 713/320; 455/405
  See application file for complete search history.

(56) References Cited

U.S. PATENT DOCUMENTS

| | | | |
|---|---|---|---|
| 5,465,392 A * | 11/1995 | Baptist et al. ................. | 370/310 |
| 6,301,573 B1 * | 10/2001 | McIlwaine et al. ............. | 706/61 |
| 8,060,653 B2 | 11/2011 | Roberts et al. | |
| 2002/0031119 A1 * | 3/2002 | Brouet et al. ................. | 370/386 |
| 2003/0076808 A1 * | 4/2003 | McNiff et al. ................. | 370/345 |
| 2006/0069769 A1 * | 3/2006 | Dacosta ......................... | 709/224 |
| 2006/0072721 A1 * | 4/2006 | Wisniewski ................. | 379/88.22 |
| 2006/0148477 A1 * | 7/2006 | Reilly ............................ | 455/436 |
| 2006/0209715 A1 * | 9/2006 | Kushalnagar et al. ........ | 370/254 |
| 2007/0147285 A1 * | 6/2007 | Jin et al. ......................... | 370/329 |
| 2007/0183355 A1 * | 8/2007 | Kuchibhotla et al. ......... | 370/318 |
| 2007/0240163 A1 * | 10/2007 | Conrad et al. ................. | 718/107 |
| 2007/0259673 A1 * | 11/2007 | Willars et al. ................. | 455/453 |
| 2008/0144574 A1 * | 6/2008 | Jayapalan et al. ............ | 370/331 |
| 2008/0151828 A1 * | 6/2008 | Bjorken et al. ............... | 370/329 |
| 2008/0178095 A1 * | 7/2008 | Lee ................................ | 715/747 |
| 2008/0301292 A1 * | 12/2008 | Oya .............................. | 709/224 |

(Continued)

OTHER PUBLICATIONS

U.S. Appl. No. 13/207,221, Michael Chan, "Scheduling Data Pushes to a Mobile Device Based on Usage and Applications Thereof," Filed Aug. 10, 2011.

*Primary Examiner* — Alina N. Boutah
(74) *Attorney, Agent, or Firm* — Holland & Knight LLP; Brian J Colandreo, Esq.; V. Raman Bharatula, Esq.

(57) ABSTRACT

Embodiments relate to pushing data to mobile devices more efficiently. In a first embodiment, a computer-implemented method receives pushed data on a mobile device. The method includes: (a) recording, at a memory of the mobile device, information describing activity occurring on the mobile device during a first time period; (b) sending, from the mobile device to a server, data indicating the first time period and activity data indicating whether the mobile device was active during the first time period; and (c) during a second time period occurring after the recording (a) and sending (b), receiving application data pushed to the mobile device at a first rate determined based at least in part on the activity data sent to the server in (b), wherein the second time period is determined by the server based at least in part on the data indicating the first time period.

24 Claims, 4 Drawing Sheets

U.S. PATENT DOCUMENTS

| | | |
|---|---|---|
| 2009/0054006 A1* | 2/2009 | Cai et al. .................... 455/73 |
| 2009/0061781 A1* | 3/2009 | Zhang ....................... 455/66.1 |
| 2009/0098821 A1* | 4/2009 | Shinya ...................... 455/3.01 |
| 2009/0124284 A1* | 5/2009 | Scherzer et al. .......... 455/552.1 |
| 2009/0137225 A1* | 5/2009 | Costanzo et al. ........... 455/405 |
| 2009/0144359 A1* | 6/2009 | Karlsen et al. .............. 709/203 |
| 2009/0149185 A1* | 6/2009 | Narasimha .................. 455/442 |
| 2009/0153598 A1* | 6/2009 | Blank et al. .................. 346/20 |
| 2009/0210516 A1* | 8/2009 | Roskowski ................... 709/219 |
| 2009/0275349 A1* | 11/2009 | Bae et al. .................... 455/466 |
| 2009/0307715 A1* | 12/2009 | Santamaria et al. ......... 719/318 |
| 2010/0030874 A1* | 2/2010 | Ormond et al. .............. 709/220 |
| 2010/0075807 A1* | 3/2010 | Hwang et al. ................... 482/8 |
| 2010/0235749 A1* | 9/2010 | Ratnakar ...................... 715/733 |
| 2010/0325194 A1* | 12/2010 | Williamson et al. ......... 709/203 |
| 2011/0029670 A1* | 2/2011 | Klein et al. ................... 709/225 |
| 2011/0059763 A1* | 3/2011 | Yoshiuchi et al. ............ 455/522 |
| 2011/0185202 A1* | 7/2011 | Black et al. ................... 713/320 |
| 2011/0195696 A1* | 8/2011 | Fogel et al. ................. 455/414.1 |
| 2011/0258280 A1* | 10/2011 | Sloan et al. .................. 709/207 |

\* cited by examiner

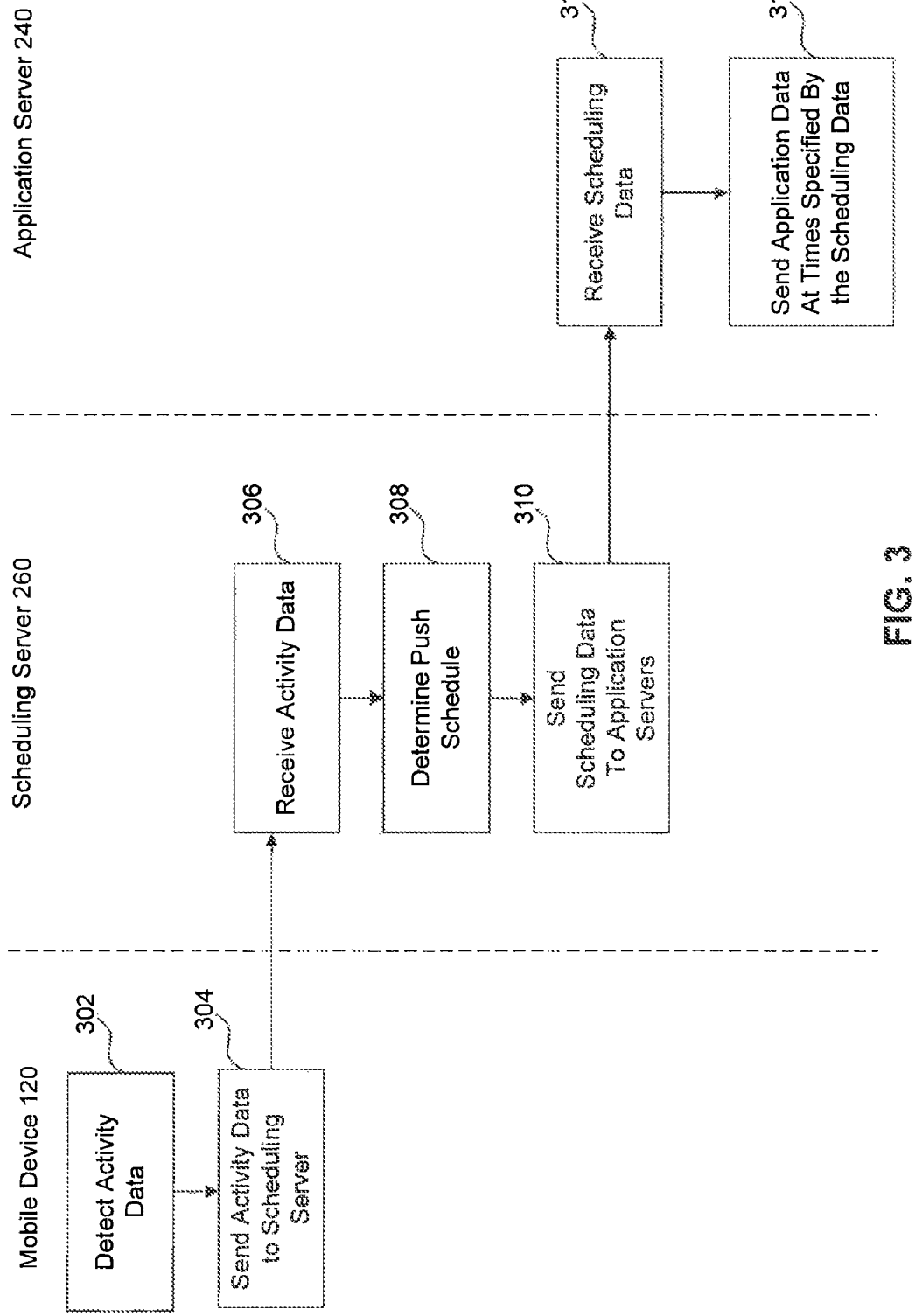

SCHEDULING DATA PUSHES TO A MOBILE DEVICE BASED ON USAGE AND APPLICATIONS THEREOF

This application is a continuation of U.S. patent application Ser. No. 13/207,221 filed Aug. 10, 2011, which claims priority to U.S. Provisional Patent Application No. 61/372,273 filed Aug. 10, 2010, both of which are incorporated herein by reference in their entirety.

BACKGROUND

1. Field

This field generally relates to pushing data to a mobile device.

2. Related Art

Some mobile devices, such as cell phones, personal digital assistants (PDAs), portable navigation devices (PNDs) and handheld game consoles, include applications that receive data over the network. Data sent to the mobile device may be either pushed or pulled. When data is pulled, the mobile device generally requests the data from a server. Pulling data enables the mobile device to retrieve data when it needs it. However, pulling data may also result in the mobile device making data requests when no new updates have been made or may result in delay in receiving data.

When data is pushed, the server generally controls when data is sent to the mobile device. Pushing data enables the server to send data only when new updates are available. Further, the server may choose not to send data whenever new updates are available, instead periodically sending batch updates. However, because the server controls when the updates are made, the server may send updates when the mobile device does not need them. These updates may result in unneeded power consumption on the mobile device.

Systems and methods are needed to push data to mobile devices more efficiently.

BRIEF SUMMARY

Embodiments relate to pushing data to mobile devices more efficiently. In a first embodiment, a computer-implemented method receives pushed data on a mobile device. The method includes: (a) recording, at a memory of the mobile device, information describing activity occurring on the mobile device during a first time period; (b) sending, from the mobile device to a server, data indicating the first time period and activity data indicating whether the mobile device was active during the first time period; and (c) during a second time period occurring after the recording (a) and sending (b), receiving application data pushed to the mobile device at a first rate determined based at least in part on the activity data sent to the server in (b), wherein the second time period is determined by the server based at least in part on the data indicating the first time period.

In a second embodiment, a computer-implemented method pushes data to a mobile device. The method includes: (a) receiving, on a server remote from the mobile device, data indicating a past time period and usage data of the mobile device during the past time period; (b) determining a time period in the future that corresponds to the past time period received in (a); (c) determining when to push application data to the mobile device during the future time period, wherein the application data is pushed periodically at a rate determined according to the usage data during the past time period received in (a); and (d) during the time period determined in (b), sending application data to the mobile device periodically as determined in (c).

System and computer program product embodiments are also disclosed.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 3 is a flowchart that illustrates a method for scheduling data pushes which may be used in operation of the system in FIG. 2.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
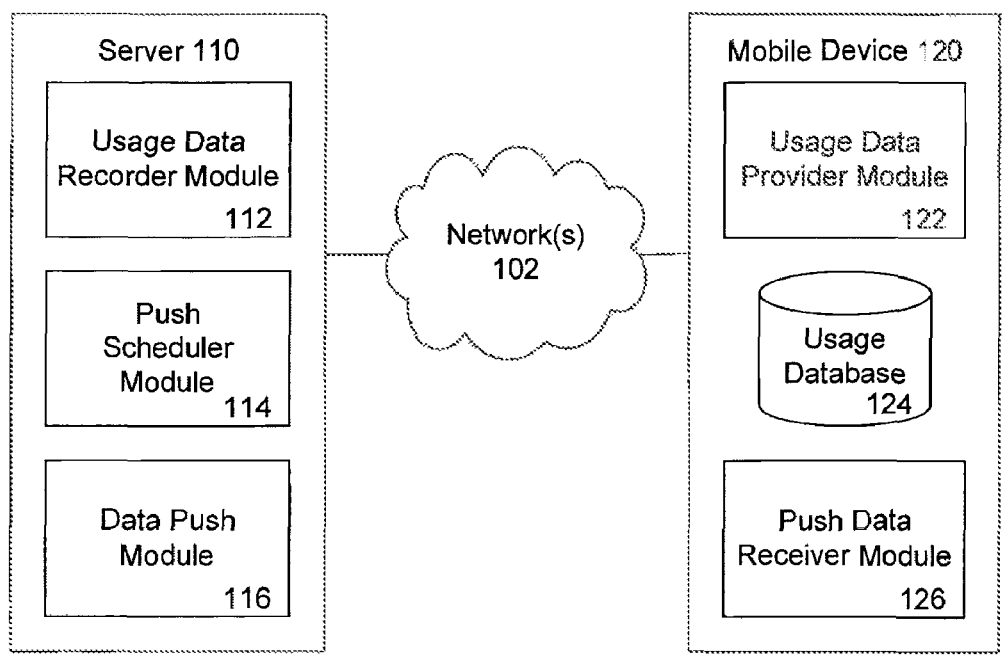
FIG. 1 is a diagram that illustrates a system for scheduling data pushes to a mobile device based on activity on the mobile device, according to an embodiment.

FIG. 1 is a diagram that illustrates a system for scheduling data pushes to a mobile device based on activity of the mobile device, according to an embodiment. System 100 includes a server 110 and a mobile device 120 coupled via one or more networks 102, such as the Internet. Mobile device 120 includes a usage data provider module 122, a push data receiver module 126 and a usage database 124. Server 110 includes a usage data recorder module 112, a push scheduler module 114, and a data push module 116. Mobile device 120 can be any wireless computing device capable of transmitting and/or receiving information wirelessly, such as a cellular telephone, portable digital assistant (PDA), tablet computing device, laptop, notebook, or netbook computer, etc.

In general, system 100 may operate as follows. Mobile device 120 may record usage data in usage database 124. Usage data provider module 122 may send usage data to server 110 via network(s) 102. On server 110, usage data recorder module 112 may receive the usage data. Push scheduler module 114 may use the usage data to determine a schedule for pushing data to mobile device 120. At times specified by the schedule, data push module 116 may push data to push data receiver module 126 on mobile device 120. Each of the components and its operation are described in greater detail below.

As mentioned above, usage database 124 may store data relating to the usage associated with the mobile device. In embodiments, usage database 124 may store times and/or time periods when a user touches a touch screen included on the mobile device, when the mobile device is in sleep mode, or when the mobile device is unlocked. In an alternative embodiment, usage database 124 may store times and/or time periods when a user is using specific applications installed on the mobile device.

A mobile device sleeps when it is in a state where it consumes less power than an awake state. While a mobile device consumes less power in a sleep state, it may consume more power than being turned off completely. To execute one or more operations, the mobile device generally must transition from a sleep state to an awake state. Transitioning from a sleep state to an awake state may take less time than starting the mobile device from a power-off state. A mobile device may automatically enter a sleep state after a period of inactivity.

Similar to the sleep state, the mobile device may also automatically enter a lock state after a period of inactivity. The lock state may serve to avoid inadvertent or unauthorized access to the mobile device, by only accepting a specific input to unlock the device. In an example, the mobile device may not accept any other input until a particular touch gesture input is received. Receipt of the particular touch gesture input may confirm that the user intends to access the device and that the touches are not accidental touches that may for example occur when the mobile device is in a user's pocket or purse. In addition to preventing inadvertent access, the lock state may prevent unauthorized access, such as access to a user's personal data, to the mobile device. The lock screen module may receive an input to authenticate the user and, in response to the authenticated input, unlock the mobile device. In an example, the input may be a touch gesture that the user had pre-set for authentication purposes. While in the lock state, the mobile device may display a pre-specified lock screen view.

Figure 4A:
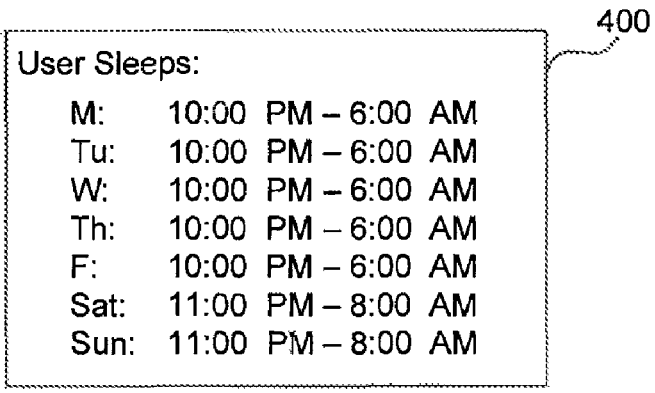
FIG. 4A shows an example of activity data provided by the mobile device.

Usage data provider module 122 may access usage database 124 and send data to server 110. The data sent by usage data provider module 122 may indicate a time period and usage data associated with the mobile device during the time period. An example 400 of data sent by usage data provider module 122 is illustrated in FIG. 4A. In an embodiment, usage data provider module 122 may define and/or provide data that indicates one or more time periods during which the mobile device is an active state. In examples, the time periods when the mobile device is in a sleep state may be specified by when the mobile device sleeps or when the user is/was not currently operating and/or otherwise engaged with the mobile device.

In other examples, the time periods when the device is active may be designated by the periods when the screen is on, when an application is launched and running, when the user is inputting data (e.g., via button presses or screen touches), when user latency (e.g., the time that the user takes to respond a notification, such as an email notification) exceeds a threshold, etc. These various parameters may be used together to determine whether a device is active or even how actively the device is being used and, thus, how frequently to push data to the device. In examples, the various parameters may be used to determine a score, and the score may be used to determine the push schedule. In one example, the parameters may be each assigned a weight, and the score may be determined by taking the weighted average of the various parameters. In another example, the parameters may be inserted into a neural network or other machine learning algorithm that has been previously trained to determine a score based on the parameters. As is described below, the score may be used to determine a frequency (e.g., rate) at which to push data.

As described above, usage data provider module 122 may provide data that indicates a series of time periods in which the mobile device is active. Conversely, usage data provider module 122 may provide data that indicates a series of time periods in which the mobile device is inactive. In another embodiment, usage data provider module 122 may provide data indicating a time period when specific applications are not being used.

Usage data recorder module 112 may receive the data from usage data provider module 122. In an embodiment, usage data recorder module 112 may save the usage data and corresponding time periods associated with a mobile device to a database (not shown).

Push scheduler module 114 can determine a schedule to push data to the mobile device based on the data gathered by usage data recorder module 112. As described below, pushing data may involve sending data to a mobile device without a specific request for the data. The schedule includes at least one time period in the future and a frequency at which to push data during the future time period. Push scheduler module 114 determines the schedule based on past activity data.

In one embodiment, push scheduler module 114 may determine the scheduling to instruct an application to push a data less frequently during inactive periods than during active periods. Specifically, push scheduler module 114 forecasts future periods of inactivity based on the prior periods of inactivity. Push scheduler module 114 may forecast periods of inactivity by assuming that a user's schedule is periodic, e.g., the scheduled remains relatively constant from week to week. If the mobile device was inactive until 6 am on previous Mondays, then push scheduler module 114 may determine the push schedule to be more frequent after 6 am on Mondays, and less frequent before 6 am on Mondays.

Figure 4B:
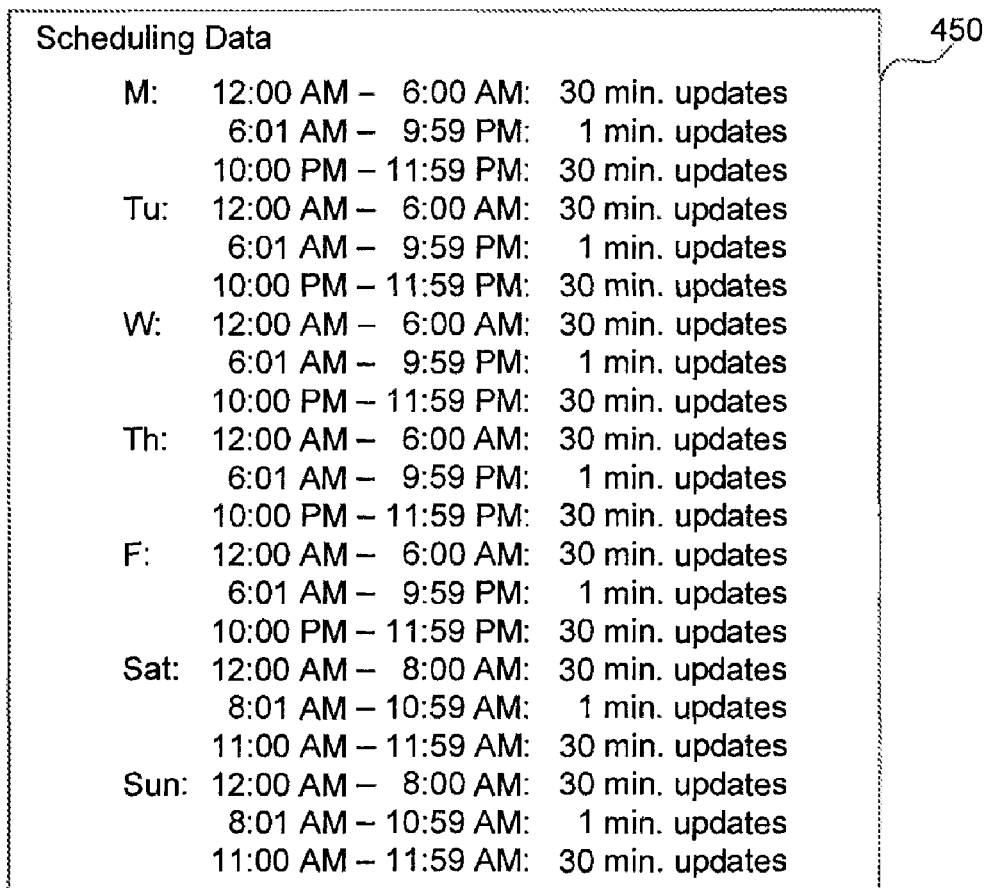
FIG. 4B shows an example of scheduling data determined according to the activity data.

For each time period, the push schedule may include a frequency associated with the time period. In one embodiment, push scheduler module 114 may use a pre-defined value for forecasted periods of active usage (e.g., 1 min updates) and may use another pre-determined value for periods of inactive usage (e.g., 30 min updates). In another embodiment, the frequency may correspond to an amount of usage anticipated for that period. As mentioned above, the usage parameters such as a frequency at which the user makes screen touches or a latency time for a user to respond to a notification may be used to determine a score indicating how actively the mobile device is being used. In that embodiment, the score for a particular past time period may be used to forecast a degree of usage in a future time period. In this way, the schedule may include frequencies for each time period that correspond to anticipated usage for that time period. An example schedule 450 is illustrated in FIG. 4B.

Data push module 116 may send application data to mobile device 120 as determined by push scheduler module 114. In an example, the data may be pushed periodically. Data may be "pushed," as opposed to "pulled," when data is sent from server 110 to mobile device 120, when the transmission is not directly in response to a request from mobile device 120. Data push module 116 may, for example, periodically send batch updates, sending the mobile device all known changes that have occurred to a data set since a previous update. While pushing data periodically, data push module 116 may be configured to "skip" a period if, for example, there is no data or little data to push. Data push module 116 sends application data at a frequency specified in the schedule determined by push scheduler module 114. In this way, data push module 116 may push application data to mobile device 120 less frequently during periods of nonusage. In examples, data push module may push email data or social networking data.

Push data receiver module 126 may receive application data pushed by data push module 116. As set forth above, the data is pushed based on forecasted usage data. By receiving push data less often during periods of inactivity when the push data is not needed, push data receiver module 126 conserves battery power of mobile device 120. Each of the components of FIG. 1 is described in greater detail below with respect to FIG. 2.

Figure 2:
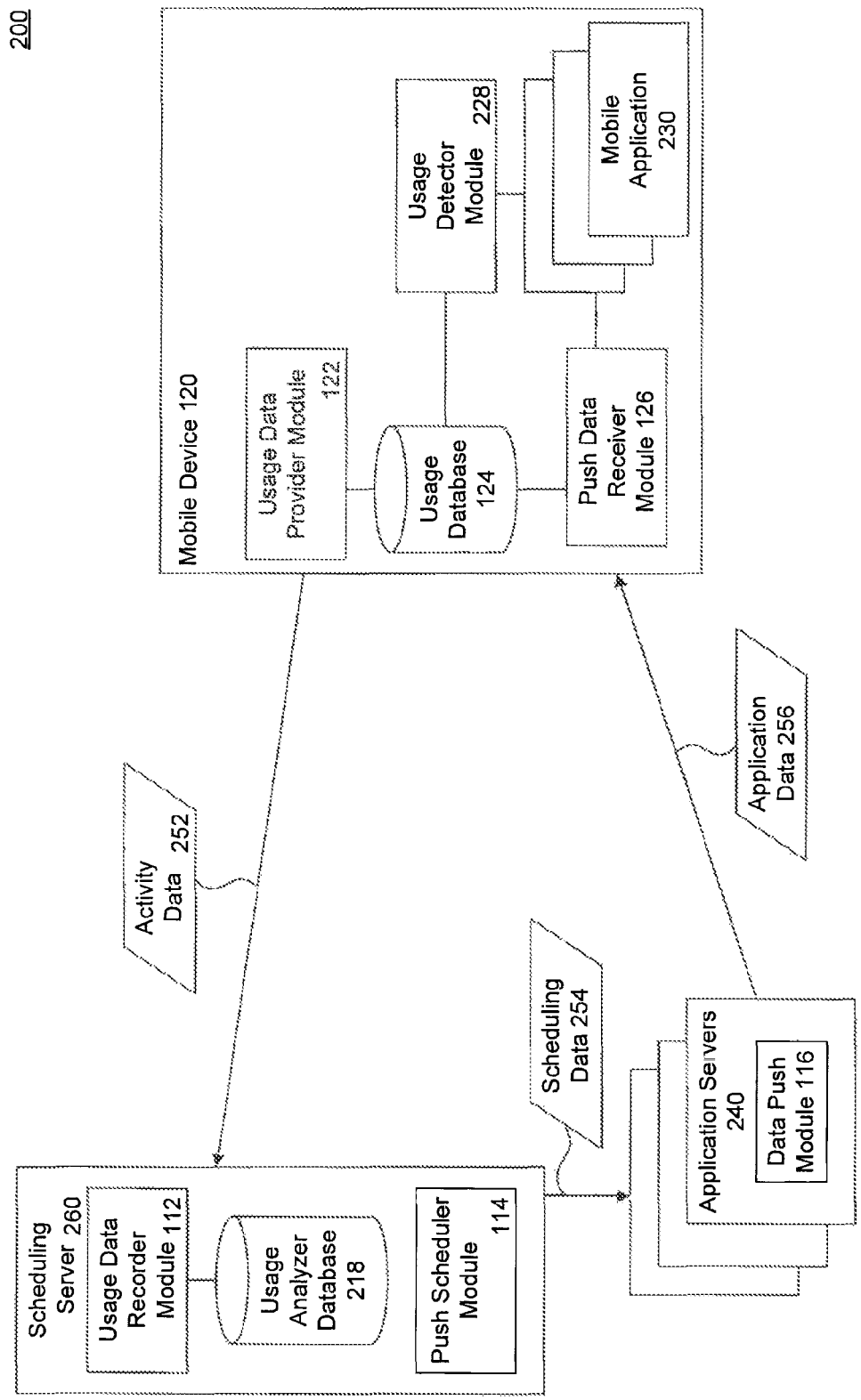
FIG. 2 is a diagram that illustrates a system for scheduling data pushes from a plurality of application servers to a mobile device based on activity on the mobile device, according to an embodiment.

FIG. 2 is a diagram that illustrates a system 200 for scheduling data pushes from an application server to a mobile device based on usage associated with the mobile device, according to an embodiment. In addition to the components of system 100 in FIG. 1, system 200 includes mobile application(s) 230, a usage detector module 228, a usage analyzer database 218, and application server(s) 240.

Mobile applications 230 may enable the mobile device to perform different functions. For example, the applications 230 may include a calendar application, an email application, or a media player application. In further examples, mobile device 120 may enable a user to cause mobile device 120 to download and install further applications 230 that add additional functionality to mobile device 120.

Usage detector module 228 may be coupled to at least one of the mobile applications 230 to monitor whether it is active. Usage detector module 228 may monitor activity associated with the mobile device 120 at different times and records the mobile device's activity over time in usage database 124. In an embodiment, usage detector module 228 may record when specific applications are in use, such as when calendar or email applications are in use. In another embodiment, usage detector module 228 may detect when mobile device 120 receives a user input, such as a touch input. In other embodiments, usage detector module 228 may record when mobile device 120 is asleep or locked, or, conversely, when mobile device 120 is awake or unlocked.

As mentioned above, usage database 124 may store usage data associated with mobile device 120. Usage data provider module 122 may send data from usage database 124 to scheduling server 260 as activity data 252. Usage data provider module 122 may aggregate and format data from usage database 124 to put it in a form for transmission. For example, usage data provider module 122 may determine time periods of inactivity (i.e., time periods during which the device is not being used and/or interacted with by a user) from usage database 124 and send the time periods in activity data 252. An example 400 of activity data 252 is illustrated in FIG. 4A.

In an embodiment, activity data 252 may not include information or data identifying a user of the mobile device to protect the privacy of the user. To further protect the user's privacy, scheduling server 260 may be managed by a trusted entity and may communicate with mobile device 120 via a secure connection. For example, activity data 252 may be encrypted using a public key on mobile device 120, and only scheduling server 260 may have the corresponding private key. Further, a user may be able to configure data usage provider module 122 to not send activity data 252. In this way, a user can opt-in or opt-out of providing to scheduling server 260 any activity data associated with/based at least in part on her usage of the mobile device.

Scheduling server 260 may receive activity data 252. In an embodiment, scheduling server 260 includes usage data recorder module 112, usage analyzer database 218 and push scheduler module 114. Usage data recorder module 112 receives activity data 252 and stores at least a portion of activity data 252 in usage analyzer database 218. In an example, usage analyzer database 218 may only store usage data for a specified time period before it is automatically deleted. In this way, scheduling server 260 may protect the user's privacy.

While only one mobile device 120 is shown for simplicity, scheduling server 260 may accept usage data from many different mobile devices. To encrypt usage data from the different mobile devices, each may include a public key corresponding to a private key of scheduling server 260.

Push scheduler module 114 may determine scheduling data 254 specifying when to push data to the mobile device. Scheduling data 254 may specify a frequency at which to push data during a particular time period in the future. Push scheduler module 114 may determine scheduling data 254 based on the data stored in usage analyzer database 218.

In an embodiment, push scheduler module 114 may determine scheduling data 254 by merely determining the times during the week when the mobile device, or a particular application having instructions stored on the mobile device, is not in use. In other embodiments, push scheduler module 114 may forecast periods when a user would likely not use the mobile device (or applications thereon) using pattern recognition algorithms. An example 450 of scheduling data 254 is illustrated in FIG. 4B. Once determined, scheduling data 254 is sent from scheduling server 260 to application servers 240.

By having a scheduling server 260 separate from application servers 240, there is no need to send activity data 252 to individual application servers 240. In other words, data that specifies the user's past usage habits is not sent to individual application servers 240. Only the data speculating how the user may use the mobile devices in the future is sent to application servers 240. In this way, separating the functionality of scheduling server 260 and application servers 240 may serve to address privacy concerns.

Application servers 240 push application data 256 to mobile devices. Application data can include, for example, calendar data, email data, social networking, and media data, such as podcasts. In an example, each application server 240 may serve application data for a corresponding mobile application 230.

Application servers 240 each receive scheduling data 254. Each application server 240 includes a data push module 116 to push application data 256 at frequencies specified by the scheduling data 254. In an example, during periods of active usage, data push module 116 may push data to mobile device 120 more frequently than during periods when the mobile device is being used less intensively.

In an embodiment, scheduling server 260 may send different scheduling data 254 to different application servers 240. For example, scheduling server 260 may send to an application server 240 scheduling data that specifically forecasts the usage of a mobile application 230 that corresponds to the application server 240. In this way, data pushes can be scheduled more precisely based on usage of a particular application.

Usage database 124 and usage analyzer database 218 may be any type of persistent memory including, for example, a SQL database.

Usage data provider module 122, usage detector module 228, mobile application 230, push data receiver module 126, data push module 116, push scheduler module 114 and usage data recorder module 112 may be implemented in hardware, software, firmware, or any combination thereof.

Mobile device 120, scheduling server 260, and application servers 240 may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a general-purpose processor, application-specific integrated circuit (ASIC), field-programmable gate array (FPGA), memory graphical user interface display and/or the like. The computing device may also have multiple processors and multiple shared or separate memory components. For example, the computing device may be a clustered computing environment or server farm.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming langaage, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

FIG. 3 is a flowchart that illustrates a method 300 for scheduling data pushes, which may be used in operation of system 200. For clarity, method 300 is described with respect to components of system 100 in FIG. 1. However, a person of ordinary skill in the art would recognize that it is not limited thereto.

Method 300 begins by detecting activity data of mobile device 120 at step 302. At step 304, usage data may be sent to the scheduling server 260. As mentioned above, the usage data sent at step 304 may indicate an amount of usage during a past time period. In an example, the usage data may simply indicate a time period in which mobile device 120 was not in use.

At step 306, scheduling server 260 may receive the usage data. Based on the past usage data received at step 306, a push schedule is determined at step 308. The push schedule may specify time periods in the future and, for the time periods, frequencies at which to push data to the mobile device at step 308. At step 310, scheduling server 260 may send scheduling data with at least a portion of the push schedule to application server 240.

At step 312, application server 240 may receive the scheduling data. Application server 240 may push application data to mobile device 120 at times specified by the scheduling data at step 314. In this way, application server 240 may push application data to mobile device 120 less frequently when the mobile device is not in use.

FIG. 4A shows a diagram 400 illustrating an example of activity data provided by the mobile device. In diagram 400, the activity data may indicate a series of past time periods in which the mobile device slept. By determining the push frequency based on the activity data, the push data may be more efficiently sent to the mobile device.

FIG. 4B shows a diagram 450 illustrating an example of scheduling data determined according to the activity data. In diagram 450, the scheduling data may indicate a series of future time periods and push frequencies corresponding to the activity data. By determining the push frequency based on the usage data, the push data may be more efficiently sent to the mobile device.

While examples provided above are described with respect to mobile devices, a skilled artisan would recognize that aspects may be applied to push applications on non-mobile devices. Example applications include social networking update and email applications.

The above embodiments have been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of this application should not be limited by any of the above-described exemplary embodiments, but should be defined only in accordance with the following claims and their equivalents.

What is claimed is:

1. A computer-implemented method for receiving pushed data on a mobile device, comprising:
   (a) recording, at a memory of the mobile device, information describing activity occurring on the mobile device during a first time period;
   (b) sending, from the mobile device to a server, data indicating the first time period and activity data based at least in part on the information recorded in (a), the activity data indicating whether the mobile device was active during the first time period; and
   (c) during a second time period occurring after the recording (a) and sending (b), receiving application data pushed to the mobile device according to a schedule determined based at least in part on the activity data sent to the server in (b), wherein the second time period is determined by the server based at least in part on the data indicating the first time period, the first time period being a past time period.

2. The method of claim 1, wherein the schedule specifies that the application data be periodically pushed at a first rate.

3. The method of claim 2, wherein the first time period is a period when the mobile device was previously inactive, and the mobile device was previously active during a third period different from the first time period, and further comprising:
  (d) during a fourth time period different from the second time period in (c), receiving pushed application data at a second rate greater than the first rate, the fourth time period corresponding to the third time period.

4. The method of claim 2, wherein the first time period is a period when a specific application was previously not in use, and the mobile device was previously in use during a third period different from the first time period, and further comprising:
  (d) during a fourth time period different from the second time period in (c), receiving pushed application data for the specific application at a second rate greater than the first rate, the fourth time period corresponding to the third time period.

5. The method of claim 1, wherein the mobile device was in a sleep mode during the first time period.

6. The method of claim 1, wherein the sending (b) comprises sending data indicating an amount of usage of a specific application on the mobile device during the first time period; and
  wherein the receiving (c) comprises receiving pushed application data for the specific application at a frequency corresponding to the indicated amount of usage of the specific application during the first time period.

7. The method of claim 1, wherein the receiving (c) comprises receiving push email data.

8. The method of claim 2, wherein the first rate of received pushed application data is determined so as to conserve battery power during the second time period.

9. A system for receiving pushed data on a mobile device, comprising:
  a usage detector module that records, at a memory of the mobile device, information describing activity occurring on the mobile device during a first time period;
  a usage data provider module that sends, from the mobile device to a server, data indicating the first time period and activity data based at least in part on the information recorded, the activity data indicating whether the mobile device was active during the first time period; and
  a push data receiver module that, during a second time period occurring after the usage data provider module sends the data indicating the first time period and the activity data, receives application data pushed to the mobile device at a first rate determined based at least in part on the activity data sent to the server, wherein the second time period is determined by the server based at least in part on the data indicating the first time period, the first time period being a past time period.

10. The system of claim 9, wherein the schedule specifies that the application data be periodically pushed at the first rate.

11. The system of claim 10, wherein the first time period indicated by the data sent by the usage data provider module is a time period when the mobile device was previously inactive, and the mobile device was previously active during a third time period different from the first time period, and
  wherein the push data receiver module receives, during a fourth time period different from the second time period, pushed application data at a second rate greater than the first rate, the fourth time period corresponding to the third time period.

12. The system of claim 10, wherein the first time period indicated by the data sent by the usage data provider module is a time period when a specific application on the mobile device was previously not in use, and the specific application was previously in use during a third time period different from the first time period, and
  wherein the push data receiver module receives, during a fourth time period different from the second time period, pushed application data at a second rate greater than the first rate, the fourth time period corresponding to the third time period.

13. The system of claim 9, wherein the mobile device was in a sleep mode during the first time period.

14. The system of claim 9, wherein the usage data provider module sends data indicating an amount of usage of a specific application on the mobile device during the first time period; and
  wherein the push data receiver module receives, during the second time period, pushed application data at a rate corresponding to the indicated amount of usage of the specific application during the first time period.

15. The system of claim 9, wherein the push data receiver module receives push email data.

16. The system of claim 10, wherein the first rate of received pushed application data is determined so as to conserve battery power during the second time period.

17. A computer-implemented method for pushing data to a mobile device, comprising:
  (a) receiving, on a server remote from the mobile device, data indicating a past time period and usage data of the mobile device during the past time period;
  (b) determining a future time period that corresponds to the past time period indicated by the data received in (a);
  (c) determining when to push application data to the mobile device during the future time period, wherein the application data is pushed periodically at a rate determined according to the usage data during the past time period received in (a); and
  (d) during the time period determined in (b), sending application data to the mobile device periodically as determined in (c).

18. The method of claim 17, wherein the receiving (a) comprises receiving data indicating a past time period when the user was not using the mobile device, and
  wherein the determining (c) comprises determining when to push application data to the mobile device during the future time period, wherein the application data is pushed periodically at a reduced frequency relative to a time period corresponding to a usage time period.

19. The method of claim 17, wherein the receiving (a) comprises receiving data indicating a past time period when the mobile device was in a sleep mode.

20. The method of claim 17, wherein the receiving (a) comprises receiving data indicating a past time period when a specific application on the mobile device was not in use, and
  wherein the determining (c) comprises determining when to push application data for the specific application to the mobile device during the future time period, wherein the application data is pushed periodically at a reduced frequency relative to a time period corresponding to a usage time period.

21. The method of claim 17, wherein the receiving (b) comprises receiving data indicating a past time period and an associated amount of usage of a specific application on the mobile device during the past time period; and wherein the determining (c) comprises determining when to push application data for the specific application to the mobile device during the future time period, the application data is pushed periodically at a frequency corresponding to the associated amount of usage.

22. The method of claim 17, wherein the sending (d) comprises sending push email data.

23. The method of claim 18, wherein the frequency of pushed application data received is determined so as to conserve battery power during periods of predicted non-usage.

24. A system for pushing data to a mobile device, comprising:

a usage data recorder module, remote from the mobile device, that receives, at one or more computing devices, data indicating a past time period and usage data of the mobile device during the past time period;

a push scheduler module that determines, at the one or more computing devices, a future time period that corresponds to the past time period indicated by the data received by the usage data recorder module and determines when to push application data to the mobile device during the future time period, wherein the application data is pushed periodically at a frequency determined according to the usage data received by the usage data recorder module; and a data push module that, during the future time period determined by the push scheduler module, sends, from the one or more computing devices, application data to the mobile device periodically as determined by the push scheduler module.

* * * * *